UNITED STATES PATENT OFFICE.

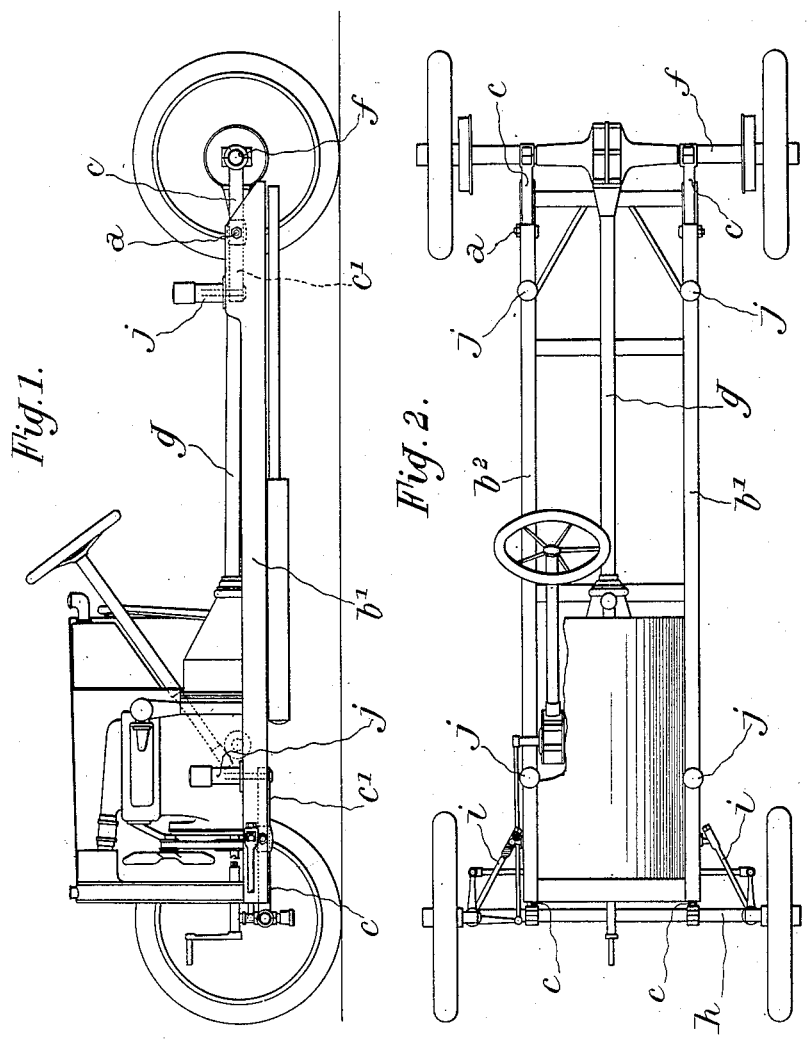

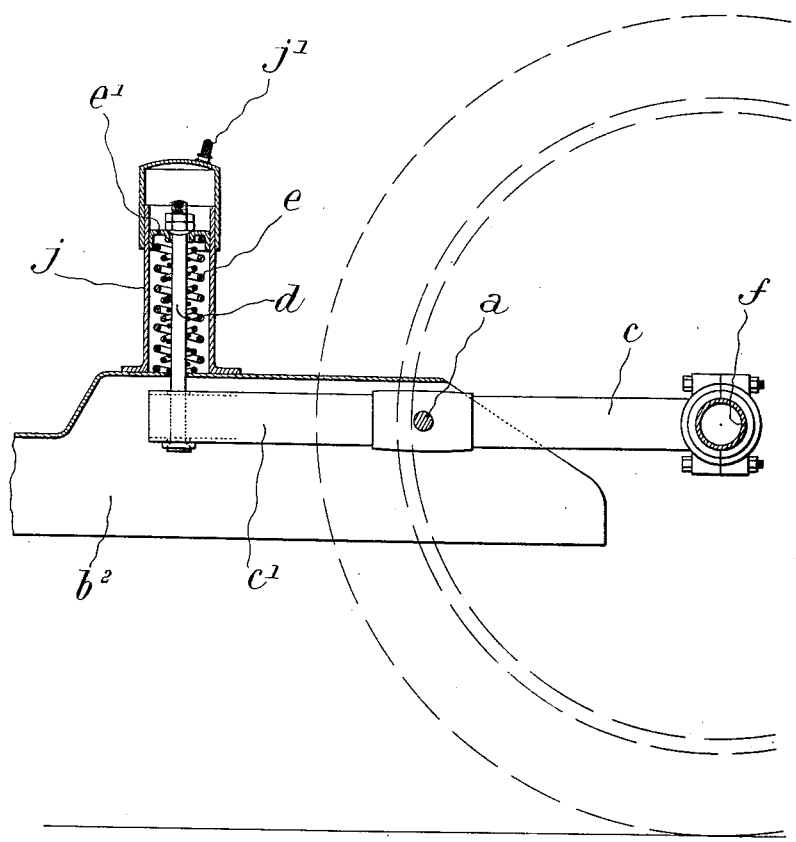

LÉON LAISNE, OF DOUAI, FRANCE.

ELASTIC SUSPENSION FOR VEHICLES.

1,316,369.  Specification of Letters Patent.  Patented Sept. 16, 1919.

Application filed November 22, 1913. Serial No. 802,482.

*To all whom it may concern:*

Be it known that I, LÉON LAISNE, engineer, citizen of the Republic of France, residing at Douai, Nord, France, 3a Boulevard Jeanne d'Arc, have invented certain new and useful Improvements in Elastic Suspensions for Vehicles, of which the following is a specification.

The invention relates to the elastic suspension of vehicles and mainly to the elastic suspension of motor vehicles.

The invention has mainly for its object to provide vehicles with suspension means which allows the frame of the vehicle to be practically uninfluenced by the shocks imparted to the wheels.

It has further for its object to provide the vehicles with suspension means which can be manufactured at a very low cost.

It has also for its object to dispense with the use of plate springs as the elastic or resilient shock absorbing means for vehicles.

The invention consists mainly of a lever and elastic or resilient means mounted in such manner that the shocks are transmitted to the frame of the vehicle in opposite directions, on the one hand directly through the said lever and on the other hand through the said elastic or resilient means. Consequently the frame, being subjected to two approximately equal actions in opposite directions, remains practically uninfluenced by the shocks.

The invention further consists in providing vehicles with shock absorbing suspending means at the rear and at the front of such type that the axles of the front and rear wheels may each rotate around a transverse axis parallel to the axle and around the central longitudinal axis of the vehicle.

The invention further consists in the details of construction and arrangement of the several parts which will be more fully hereinafter described and claimed.

In the accompanying drawings:

Figures 1 and 2 show respectively in side elevation with parts broken away, and in plan, a vehicle provided with suspending means according to the invention. Fig. 3 is a sectional elevation on an enlarged scale of a part of the vehicle illustrating one of the suspending means.

The frame of the motor or other vehicle is connected to the axles of its wheels by means of elastic or resilient shock absorbing suspending means as follows:

Pins $a$ are fixed to the longitudinal bearers $b^1$, $b^2$ of the frame or to upwardly projecting housings $b^x$ at the front and rear ends of said bearers, the bearers being hollow and having the housings struck upwardly therefrom and fully open at their free ends. The pins $a$ are located in the upper portions of the housings $b^x$ adjacent to the free ends of the latter. A lever $c$ is mounted in each of the housings and is so disposed that it may be rocked in a vertical plane, the pins $a$ extending through the centers of the levers $c$ and the latter projecting inwardly into the housings and also forwardly and rearwardly therefrom. Elastic or resilient means, such as springs $e$ are mounted in cylindrical casings $j$ disposed on the top of the housings, and in these casings piston disks $e^1$ are movably disposed and have rods $d$ engaging the same and extending downwardly through the springs and also through the tops of the housings $b^x$ and movably attached at their lower ends to the extremities $c^1$ of the levers within the housings so that when the said extremities $c^1$ of the levers $c$ are lowered they exert a compression on the elastic or resilient means in a downward direction. The compressed elastic means or springs $e$ have a tendency to pull upwardly on the rods $d$ and also on the inner extremities $c^1$ of the levers $c$ when the said extremities are depressed.

The outer end of each lever $c$ is connected by means of a universal joint, for instance an inclosed ball joint, to the corresponding axle.

Furthermore the rear axle $f$ which is as known the axle of the driving wheels, is connected in such a manner, by means of a cardan shaft to the change gear mounted on the frame, that the said axle cannot turn around its axis.

In the same manner, means are used for preventing the front axle $h$ from turning around its axis, in order that the front wheels can be steered with the usual steering gear. The said means may be for instance constituted by two rods $i$ fixed by means of ball joints respectively to the longitudinal bearers $b^1$, $b^2$ and to the ends of the axle $h$.

Preferably the elastic means instead of being constituted by a single helicoidal spring $e$, are constituted by several helicoidal springs which are acted upon successively as the load increases.

The upper ends of the cylinders $j$ form air chambers, compressed air being introduced thereinto through valves $j^1$, and the compressed air as thus supplied to the upper ends of the cylinders serves as pneumatic shock absorbing means relatively to the piston disks $e^1$ so that when the latter rise within the cylinders after being drawn downwardly to compress the springs $e$ in view of the depression of the inner extremities $c^1$ of the levers $c$, the said air cushions will obviate any shock or jar incident to the levers returning to normal positions, and when the piston disks rise in the said cylinders.

The vehicle provided with such suspensions has its axles capable of rotating both around a transverse axis corresponding to the axis of the pins $a$, and around a central longitudinal axis.

Furthermore, a shock on one of the wheels is transmitted to the frame on the one hand directly and upwardly through the pin $a$ and on the other hand and downwardly through the elastic means. The effects thus produced in opposite directions on the frame may obviously be compensated if the ratio between the arms of the levers $c$ has been suitably determined, and consequently the said frame is not influenced by the shocks and remains practically always in its normal position.

What is claimed is:

1. In a shock absorbing means of the class specified, the combination with a vehicle frame and axles, of bearers at opposite sides of the frame terminating between the axles, an intermediately fulcrumed lever mounted in and projecting outwardly from each bearer end, shock absorbing devices mounted on each bearer and connected to the inner end of each lever, each lever and its shock absorbing devices being operatively independent, and ball and socket connections between the outer ends of the respective levers and the axles.

2. In a shock absorbing means of the class specified, the combination with a vehicle frame and axles of the character specified, of bearers at opposite sides of the frame terminating between the axles, an intermediately fulcrumed rocking lever mounted in and projecting outwardly from each bearer end, shock absorbing devices mounted on the extremity of each bearer and connected to the inner adjacent end of the rocking lever, each lever and its shock absorbing devices being operatively independent, and connections between the outer ends of the respective levers and the axles.

3. In a shock absorbing means of the class specified, the combination with a frame and axles, of a bearer at each side of the frame terminating between the axles, a lever mounted in and intermediately fulcrumed to each bearer extremity, each lever projecting outwardly beyond the bearer extremity to which it is attached, shock absorbing devices on the opposite extremities of the respective bearers and each connected to the inner end of the adjacent levers, each lever, and its shock absorbing devices, being operatively independent of the remaining levers and shock absorbing devices, and connections between the outer ends of the levers and the axles.

In testimony whereof I have hereunto set my hand in presence of two subscribing witnesses.

LÉON LAISNE.

Witnesses:
HANSON C. COXE,
PAUL BLUM.